(12) United States Patent
Rune et al.

(10) Patent No.: US 10,219,184 B2
(45) Date of Patent: Feb. 26, 2019

(54) METHOD AND SYSTEM FOR HANDLING A TRAFFIC FLOW BETWEEN LOCAL SERVICE CLOUDS

(71) Applicant: Telefonaktiebolaget LM Ericsson (publ), Stockholm (SE)

(72) Inventors: Johan Rune, Lidingö (SE); Lars Westberg, Enköping (SE); Vinay Yadhav, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 131 days.

(21) Appl. No.: 15/507,132

(22) PCT Filed: Sep. 2, 2014

(86) PCT No.: PCT/SE2014/051010
§ 371 (c)(1),
(2) Date: Feb. 27, 2017

(87) PCT Pub. No.: WO2016/036289
PCT Pub. Date: Mar. 10, 2016

(65) Prior Publication Data
US 2017/0289856 A1 Oct. 5, 2017

(51) Int. Cl.
*H04W 36/00* (2009.01)
*H04L 29/12* (2006.01)
(Continued)

(52) U.S. Cl.
CPC ..... *H04W 36/0016* (2013.01); *H04L 61/2007* (2013.01); *H04L 61/2514* (2013.01);
(Continued)

(58) Field of Classification Search
CPC .......... H04W 36/0016; H04W 36/12; H04W 36/125; H04L 61/2514; H04L 61/2007;
(Continued)

(56) References Cited

U.S. PATENT DOCUMENTS

| 2003/0165121 A1* | 9/2003 | Leung ............... H04L 29/12009 370/313 |
| 2005/0021702 A1* | 1/2005 | Rangarajan ....... H04L 29/12009 709/223 |
| 2011/0013566 A1 | 1/2011 | Aso et al. |

FOREIGN PATENT DOCUMENTS

| CN | 103281406 A1 | 9/2013 |
| EP | 1 821 487 A1 | 8/2007 |

(Continued)

OTHER PUBLICATIONS

International Search Report and Written Opinion dated Jun. 1, 2015 for International Application Serial No. PCT/SE2014/051010, International Filing Date: Sep. 2, 2014 consisting of 12-pages.
(Continued)

*Primary Examiner* — Brenda H Pham
(74) *Attorney, Agent, or Firm* — Christopher & Weisberg, P.A.

(57) ABSTRACT

A method in a network node for handling a traffic flow of a User Equipment, UE. The network node creates a unique Network Address Translated, NAT:ed, Internet Protocol, IP, address mapping to an IP address of the UE. The NAT:ed IP address includes a local IP address prefix assigned to a related first local service cloud. The NAT:ed IP address is usable for the traffic flow both before and after a handover of the UE from the first local service cloud to a neighboring second local service cloud. The NAT:ed IP address is unique at least in all local service clouds neighboring to the first local service cloud, including the second local service cloud. The network node assigns the NAT:ed IP address to the UE for local break out of the traffic flow of the application session to the first local service cloud.

16 Claims, 8 Drawing Sheets

(51) Int. Cl.
*H04W 36/12* (2009.01)
*H04L 29/08* (2006.01)

(52) U.S. Cl.
CPC .............. *H04L 67/10* (2013.01); *H04W 36/12* (2013.01); *H04L 61/2084* (2013.01); *H04L 61/6068* (2013.01); *H04W 36/125* (2018.08)

(58) Field of Classification Search
CPC .. H04L 67/10; H04L 61/6068; H04L 61/2084
USPC ....... 370/349, 389, 392, 395.5, 395.52, 401, 370/402
See application file for complete search history.

(56) References Cited

FOREIGN PATENT DOCUMENTS

| | | |
|---|---|---|
| EP | 2942914 A1 | 11/2015 |
| WO | 2014114097 A1 | 7/2014 |

OTHER PUBLICATIONS

Tarik Taleb, Peer Hasselmeyer, Faisal Ghias Mir. Title: "Follow-me Cloud: An OpenFlow-Based Implementation," Published In: 2013 IEEE International Conference on and IEEE Cyber, Physical and Social Computing Green Computing and Communications (GreenCom), pp. 240-245, Aug. 20-23, 2013 consisting of 6-pages.

Supplementary European Search Report dated Jun. 9, 2017 for European Application No. EP 14 90 1108, consisting of 3-pages.

Byung-Yeob, Kim, et al. "Hierarchical Prefix Delegation Protocol for Internet Protocol Version 6 (IPv6)" Feb. 15, 2014, consisting of 13-pages.

\* cited by examiner

METHOD AND SYSTEM FOR HANDLING A TRAFFIC FLOW BETWEEN LOCAL SERVICE CLOUDS

CROSS-REFERENCE TO RELATED APPLICATIONS

This application is a submission under 35 U.S.C. § 371 for U.S. National Stage Patent Application of International Application Number: PCT/SE2014/051010, filed Sep. 2, 2014 and entitled "METHOD AND SYSTEM FOR HANDLING A TRAFFIC FLOW BETWEEN LOCAL SERVICE CLOUDS," the entirety of which is incorporated herein by reference.

TECHNICAL FIELD

Embodiments herein relate to a network node, a cloud orchestration server and methods therein. In particular, it relates to handling a traffic flow of a User Equipment, UE, and handling Internet Protocol, IP, address prefixes for local service clouds in a set of local service clouds.

BACKGROUND

Wireless terminals for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE is controlled by the radio base station.

Local service clouds in a base station are demanded to optimize a backhaul network. In a hierarchical telecommunications network the backhaul portion of the network comprises the intermediate links between a core network or a backbone network and small sub-networks at the edge of the entire hierarchical network, such as e.g. between a base station and a radio network controller.

Cloud computing in general may be portrayed as a synonym for distributed computing over a network, with the ability to run a program or application on many connected computers at the same time. It specifically refers to a Computing hardware machine or group of computing hardware machines commonly referred as a server connected through a communication network such as internet, intranet, Local Area Network (LAN) or Wide Area Network (WAN) and Individual user or users as well as base stations who have permission to access the server can use the server's processing power for their individual computing needs like to run an application, store data or any other computing need alike.

The local service clouds in a base station enable local functions to be added to the base station such as e.g. data compression, tunneling, and Forward Error Correction (FEC) function to enhance the backhaul when internet is used as a backhaul. Further examples are local applications, e.g. the backhaul network usually has bottlenecks that will limit the performance of the applications at the core network sites. Applications running in the local service cloud at the base station site will fully utilize the radio link.

One of the problems to enable application execution for a UE at a base station site is the local breakout of traffic from the Radio Bearers (RBs) to the local application at the local service cloud. The RBs will be further explained below. The local breakout is usually realized by a classifier which inspects passing data traffic. Based on the inspected passing data traffic, the classifier classifies the data traffic e.g. based on Differentiated Services Code Point (DSCP) and/or 5-tuple. A 5-tuple refers to a set of five different values related to a Transmission Control Protocol/Internet Protocol (TCP/IP) connection. The 5-tuple includes a source IP address/port number, destination IP address/port number and the protocol in use. Based on the classified data traffic, the classifier then routes traffic classified as local application traffic through a specific interface between the base station and the local service cloud.

The end-to-end traffic, one end is the UE and the other end is the server where the application/service is running, i.e. the non-local traffic, may be tunneled within a GTP-tunnel. The classification is made on the end-to-end traffic instead of the tunnel header. This is known for persons skilled in 3GPP-architecture.

There are many bearers, i.e. GTP-tunnels to a base station and there are many base stations. Due to the mobility of the UEs the UEs connected to a base station is varying over-time i.e. one UE moves its connection between many base stations. The specific set of UEs connected to one base station is therefore varying over time. A RB is an association for the base-station to know how and to which UE the traffic should be sent to. The RB has two directions, one uplink direction which is the traffic from the UE to the base station, and one downlink direction which is the traffic from the base station towards the UE.

The traffic in the uplink can easily be classified and broken out, i.e. routed to the local service cloud. If any kind of tunnel header is used for a broken out packet, such as a GTP tunnel header, it is stripped off before the packet is delivered to the application server in the local service cloud, such that the application server only receives the native end-to-end packets.

An IP address is allocated the to a UE when a default bearer is activated. The IP address allocated for the default bearer is used for the dedicated bearers within the same Packet Data Network connection. A major problem in this scenario is that the UE's IP address cannot be guaranteed to be unique. Several UEs may be allocated the same private IP address. This is most critical when the traffic shall be routed downlink and the traffic from the local service cloud shall be inserted, i.e. broken in, into a RB belonging to the correct UE. There are many UEs and downlink RBs to select between and a native IP packet which is sent from the local service cloud has no relation to UE identities or RB identities. The lack of guaranteed IP address uniqueness is a problem also in the uplink, since the traffic from different UEs may interfere, i.e. be mixed with each other and confuse the application servers in the local service cloud. The applications in the local service cloud require different UE IP addresses and the operating system uses the UE IP addresses and port numbers as identifiers of the application sessions. Here the operating system is referred to is that of a Virtual Machine (VM) running inside the local service cloud.

Note also that one UE may use several servers in the local service cloud such that traffic from those servers must be broken in and routed to the same UE.

An Evolved Packet System (EPS) is a central network portion of the UMTS LTE mobile communication system. An EPS primarily transfers packet data between edge networks and the radio access network. In an EPS network a bearer between a UE and a Packet Data Network (PDN) Gateway (PGW). is denoted "EPS bearer". In between the UE and the PGW the EPS bearer traverses an eNodeB (eNB) and a Serving Gateway (SGW). The parts of the EPS bearer between the PGW and the SGW and between the SGW and the eNB are realized through GTP tunnels. The part of the EPS bearer between the eNB and the UE is realized through radio interface user plane protocols and is denoted Radio Bearer (RB). An EPS bearer is bidirectional, i.e. it has both an uplink and a downlink direction.

SUMMARY

It is therefore an object of embodiments herein to provide a way of improving the performance in a wireless radio network using local service clouds.

According to a first aspect of embodiments herein, the object is achieved by a method in a network node for handling a traffic flow of a User Equipment, UE. The network node is related to a first local service cloud, and the traffic flow is related to an application session served by the first local service cloud. The network node creates a unique Network Address Translated, NAT:ed, Internet Protocol, IP, address mapping to an UE IP address of the UE. The unique NAT:ed IP address comprises a local IP address prefix assigned to the first local service cloud. The unique NAT:ed IP address is enabled to be used for the traffic flow both before and after a handover of the UE from the first local service cloud to a neighbouring second local service cloud. The unique NAT:ed IP address is unique at least in all local service clouds neighboring to the first local service cloud, including the second local service cloud. The network node assigns the unique NAT:ed IP address to the UE for local break out of the traffic flow of the application session to the first local service cloud.

According to a second aspect of embodiments herein, the object is achieved by a method in a cloud orchestration server for handling Internet Protocol, IP, address prefixes for local service clouds in a set of local service clouds. The cloud orchestration server, generates a unique local IP address prefix for each one of the respective local service clouds in the set of local service clouds. The unique local IP address prefix is for creating unique Network Address Translated, NAT:ed, IP address mapping to an User Equipment, UE, IP address.

The generating of the unique local IP address prefix to each of the respective local service cloud in the set of local service clouds comprises that:

The cloud orchestration server assigns an IP address prefix for all the local service clouds in the set of local service clouds.

The cloud orchestration server divides the assigned IP address prefix into a number of local IP address prefixes, wherein the number of local IP address prefixes is equal to the number of local service clouds in the set of local service clouds.

The cloud orchestration server further assigns each one out of the number of local IP address prefixes to each respective local service cloud in the set of local service clouds such that each local IP address prefix is unique among the local IP address prefixes of the local service clouds in the set of local service clouds, which local IP address prefixes are to be assigned to User Equipments, UEs, for local break out of traffic flows of application sessions to local service clouds in the set of local service clouds.

According to a third aspect of embodiments herein, the object is achieved by a network node for handling a traffic flow of a User Equipment, UE. The network node is arranged to be related to a first local service cloud, and which traffic flow is to be related to an application session served by the first local service cloud.

The network node is configured to create a unique Network Address Translated, NAT:ed, Internet Protocol, IP, address mapping to an UE IP address of the UE, wherein the unique NAT:ed IP address comprises a local IP address prefix assigned to the first local service cloud. The unique NAT:ed IP address is enabled to be used for the traffic flow both before and after a handover of the UE from the first local service cloud to a neighbouring second local service cloud. The unique NAT:ed IP address is unique at least in all local service clouds neighbouring to the first local service cloud, including the second local service cloud 112.

The network node is further configured to assign the unique NAT:ed IP address to the UE for local break out of the traffic flow of the application session to the first local service cloud.

According to a fourth aspect of embodiments herein, the object is achieved by a cloud orchestration server for handling Internet Protocol, IP, address prefixes for local service clouds in a set of local service clouds. The cloud orchestration server is configured to generate a unique local IP address prefix for each one of the respective local service clouds in the set of local service clouds. The unique local IP address prefix is for creating unique Network Address Translated, NAT:ed, IP address mapping to an User Equipment, UE, IP address.

The cloud orchestration server is configured to generate the unique local IP address prefix to each of the respective local service cloud in the set of local service clouds by:

assigning an IP address prefix for all the local service clouds in the set of local service clouds, dividing the assigned IP address prefix into a number of local IP address prefixes, wherein the number of local IP address prefixes is equal to the number of local service clouds in the set of local service clouds, and assigning each one out of the number of local IP address prefixes to each respective local service cloud in the set of local service clouds, such that each local IP address prefix is unique among the local IP address prefixes of the local service clouds in the set of local service clouds, which local IP address prefixes are to be assigned to User Equipments, UEs, for local break out of traffic flows of application sessions to local service clouds in the set of local service clouds.

An advantage of embodiments herein is that it allow UEs to use services on local service clouds without having an IP address collision from other UEs connected to the same local service cloud. Embodiments herein also takes care to avoid collision of UE IP addresses when the UE is handed over from one local service cloud to another.

BRIEF DESCRIPTION OF THE DRAWINGS

Examples of embodiments herein are described in more detail with reference to attached drawings in which.

DETAILED DESCRIPTION

Figure 1:
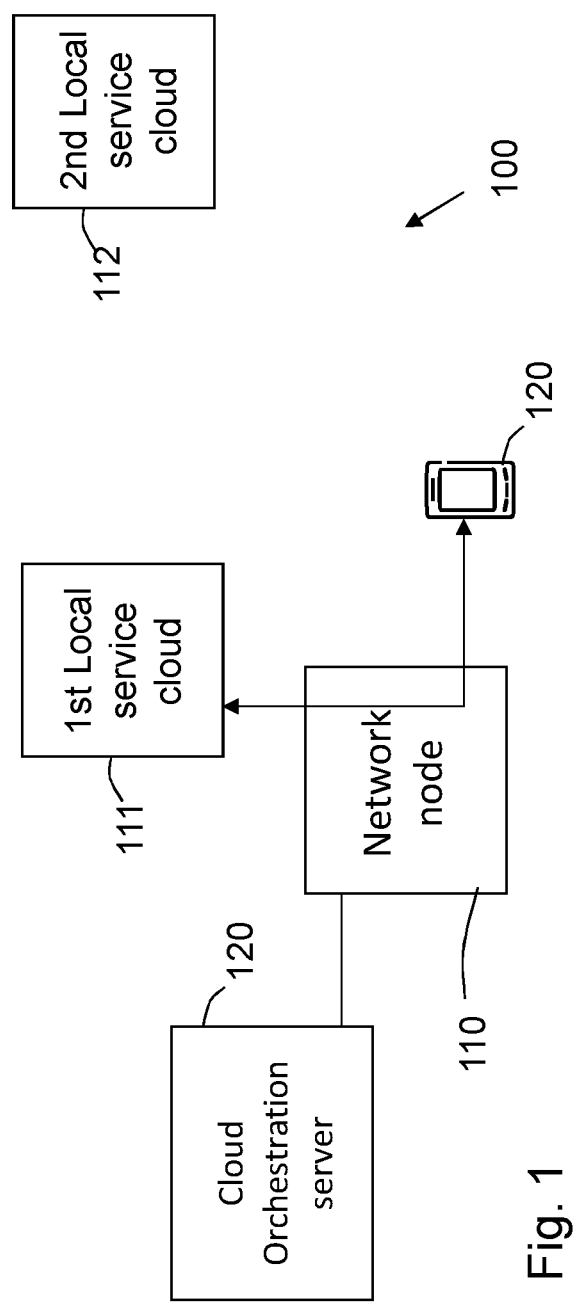
FIG. 1 is a schematic block diagram illustrating embodiments of a network.

As part of developing embodiments herein a problem was first identified and will be discussed below.

A solution to handle the problem of non-unique UE addresses is by introducing Network Address Translation (NAT) between the UE and the local service cloud.

NAT

Primarily NAT was introduced to the world of Information Technology (IT) and networking due to the lack of IP addresses. When computers and servers within a network communicate, they need to be identified to each other by a unique address, in which resulted in the creation of a 32 bit number, and the combinations of these 32 bits would accommodate for over 4 billion unique addresses, known as IP address. This was named IPv4, and although over 4 billion addresses sounds a lot, it really is not considering how fast the world of computers and the internet has grown.

To circumvent this problem, a temporary solution was produced known as NAT. NAT resulted in two types of IP addresses, public and private. A range of private addresses were introduced, which anyone could use, as long as these were kept private within the network and not routed on the internet.

NAT allows the use these private IP address on the internal network. So within a private network a unique IP address is assigned to all computers, servers and other IP driven resources in the private network. Another company can use the same private IP addresses as well, as long as they are kept internal to their network. So two companies may use the same range of IP addresses but because they are private to their network, they are not conflicting with each other.

However when internal hosts need to communicate with a public network such as the Internet the public address is used. This address is a routable public address everyone can see, which would represent the network gateway of the user.

A problem with a NAT solution is that the NAT:ed UE-addresses are locally unique. The uniqueness will not hold in mobile scenarios, where movements may cause the UE to connect to a new local service cloud in which the NAT:ed IP address is not unique.

A further problem with the NAT solution is that some applications may not work equally well when there is a NAT in the path. Here the path refers to the connection between the 2 ends of communication.

The lack of uniqueness of the UE IP address is a consequence of 3GPP architecture where the core network decides and allocates an IP address range to each Access Point Name (APN). The same IP address range or overlapping ranges may be allocated to different APNs, such that IP addresses can be reused between APNs.

An APN identifies a PDN that a mobile data user wants to communicate with. In addition to identifying a PDN, an APN may also be used to define the type of service, such as e.g. connection to a wireless application protocol server, multimedia messaging service (MMS), that is provided by the PDN. APN is used in 3GPP data access networks, e.g. General Packet Radio Service (GPRS), and EPC.

Another problem with the NAT solution is that a NAT includes a state that makes it difficult to interwork with mobility. The connectivity is broken when the mobile is handed over to another base-station.

When a UE does not perform handover, the identification is made locally unique and therefore will the mapping between the locally unique UE-IP-address and RB for the downlink direction works well. The unique local address is the only needed identifier for the RB. However, the NAT:ed UE-address are locally unique, but the uniqueness will neither hold due to mobility nor when the mobiles are connected to different local service clouds. A NAT includes a state that makes it difficult to interwork with mobility. The connectivity is broken when the UE is handed over to another base-station.

According to embodiments herein, NAT is used to create a globally unique address such that it will be unique even if a handover are performed. In this case, the end-user UE IP address does not need to be globally unique, because the uniqueness is created by a network node e.g. comprising a local break out function by NAT:ing the UE-IP-address to the global UE-address space.

Embodiments herein thus addresses the problem of UE IP address collision in local service clouds, not limited to but including the scenarios involving a handover of the UE from one local service cloud to another. Embodiments herein provides two distinct methods to resolve UE IP address collision, first using IPv6 address NAT and second using IPv4 address NAT with reuse over geographical area. As mentioned above, an advantage of embodiments herein is that it allow UEs to use services on local service clouds without having an IP address collision from other UEs connected to the same local service cloud. Embodiments herein also takes care to avoid collision of UE IP addresses when the UE is handed over from one local service cloud to another.

FIG. 1 depicts a wireless network 100 in which embodiments herein may be implemented. The wireless network 100 is a wireless communication network such as an LTE, a WCDMA, a Wimax, or any cellular network or system.

The wireless network 100 comprises a network node 110. The network node 110 is a unit comprising local break out function to be used for local break out of the traffic flow of application sessions to local service clouds. The network node 110 may be related to a base station. The network node 110 may be stand alone or co-located with the base station. The base station may be referred to as a transmission point, a radio base station, an eNB, an eNodeB, a Home Node B, a Home eNodeB or any other network node capable to serve a UE or a machine type communication device in a wireless communications network.

The wireless network 100 comprises local service clouds such as a first local service cloud 111 and a second local service cloud 112. The network node 110 is related to the first local service cloud 111. The second local service cloud a neighbouring local service cloud to the first local service cloud 111.

The wireless network 100 further comprises a cloud orchestration server 115. The cloud orchestration server 115 orchestrates the service clouds in the wireless network 100, such as the first local service cloud 111 and the second local service cloud 112. The cloud orchestration server 115 may handle allocation and orchestration of various resources and services in a cloud platform. The cloud orchestration server 115 may deal with allocation of VMs, networks, storage resources in a cloud platform. It may also deal with starting, stopping, placing and relocating these resources in a cloud platform.

A number of UEs are located in the wireless radio network 100. In the example scenario of FIG. 1, only one UE, a UE 120 is located in the wireless radio network 100. The UE 120 may e.g. be, a mobile wireless terminal, a mobile phone, a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term UE used in this document also covers other wireless terminals such as Machine to machine (M2M) devices. The UE 120 is capable of running an application sessions served by the first local service cloud 111. This is when the UE is served by the network node 110 related to the first service cloud 111.

According to embodiments herein, NAT is used to create a globally unique address such that it will be unique even if a handover are performed. In this case, the end-user UE IP address does not need to be globally unique, because the uniqueness is created by a network node e.g. comprising a local break out function by NAT:ing the UE-IP-address to the global UE-address space. The local break out function is commonly comprised in a base station. NAT is the translation of an IP address, and sometimes port number, belonging to one IP address space in an IP header, and sometimes Transmission Control Protocol/User Datagram Protocol (TCP/UDP) header, into an IP address, and sometimes port number, that belongs to another IP address space.

This means that mapping of downlink performed by a base station will use the global but NAT:ed IP address as an identifier to the appropriate radio bearer.

The NAT requires that the state is moved at handover such that it is the same NAT:ed UE-address is used after handover. Here a state refers to the IP address mapping used in the NAT:ing process. Several known methods may be used to moving state-information which is out-of-scope of the embodiments herein.

There are 17.8 Millions of private IPv4-addresses. Assume that there are 50-100 k instances of local service clouds that are used, then only a couple of 100 addresses/per cloud may be used. This means that the private IPv4 space does not generate sufficient unique address space. So, if it is assumed that the NAT:ed UE-address should be unique, it requires that the allocation is coordinated among the different local service clouds. This is performed by a cloud orchestration server.

One way may be to generate a unique NAT:ed address plan.

One way of generating a unique NAT:ed address plan, is to do a directory of the assignment of addresses. The directory may comprise:

A Global IP-address directory—All UEs IP-addresses known in a global directory and a Locally assigned addresses to each Local Service Cloud and a local directory for each Local service Cloud.

For IPv4 addresses methods for IP address re-use are provided. A UE IP address is one of the possible addresses under a locally assigned prefix. For example if 10.10.8.0/21 is the local address prefix, then example of one of the UE IP addresses may be: 10.10.8.1

In summary, a UE IP address is one of the possible addresses under an IP prefix, which is known in the art.

The example above relates to an IPv4 Address but the concept is the same for IPv6 addresses as well.

Some examples of embodiments to achieve a scalable solution for a NAT:ed UE-IP-address comprises:

IPv4-Address re-use over larger geographical area. The same address-space may statistically be re-used if the geographical distance is large due to that the session time have limited reach, e.g. a combination of combination of mobility and session time performed by a cloud orchestration server.

Time-to-live for an allocated IP-address, the allocation is made for a certain time. When the life-time expires, the address can be re-used. The action of reuse is performed by the cloud orchestration server, but decision to do it may be taken based on the information gathered at the base stations.

De-allocate the allocated IP address when it has been unused for a certain time period, which is performed by the base station.

When IPv6 is used within a local service cloud, a NAT:ed IPv6 address may be globally unique over the whole wireless network. However, it requires that any server can in the local service cloud that is providing a service to the UE supports IPv6 communications.

Figure 2:
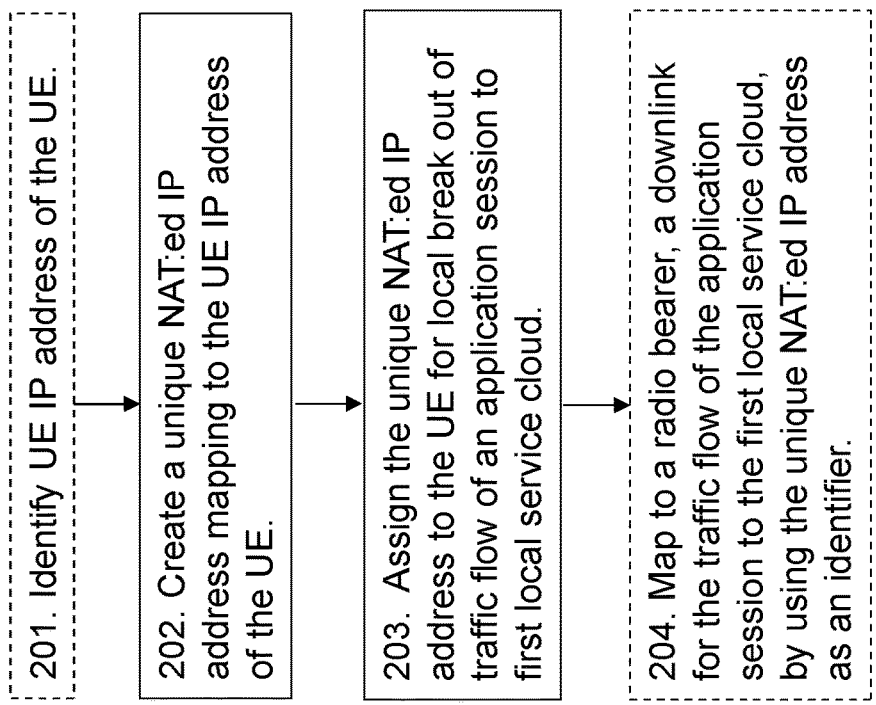
FIG. 2 a flowchart depicting embodiments of a method in a network node.

Example embodiments of a method in a network node 110 for handling a traffic flow of a UE 120 will now be described with reference to a flowchart depicted in FIG. 2. The network node 110 is related to a first local service cloud 111. The traffic flow is related to an application session served by the first local service cloud 111. As mentioned above, the network node 110 may be arranged to be comprised in a base station 101.

The method is described in a general way first. The method will then be described more in detail below. The method comprises the following actions, which actions may be taken in any suitable order. Dashed lines of some boxes in FIG. 2 indicate that this action is not mandatory.

In an example scenario the UE 120 is served by the network node 110 related to the first local service cloud. The network node 110 has detected a traffic flow of an application session of the UE 120 suitable for local break out to the first local service cloud 111.

Action 201

The network node 110 may identify a UE IP address of the UE 120.

In some embodiments, the network node 110 identifies a UE IP address and a port number of the UE 120. This may be related to as identifying a combination of the UE IP address and the port number. A port is a transport layer protocol, such as UDP/TCP, communication endpoint that a service or an application associates with to send or receive data over the wireless network. This action may be performed before or after Action 202 and 203.

Action 202

The network node 110 creates a unique NAT:ed IP address mapping to an UE IP address of the UE 120. The unique NAT:ed IP address comprises a local IP address prefix assigned to the first local service cloud 111. The unique NAT:ed IP address is enabled to be used for the traffic flow both before and after a handover of the UE 120 from the first local service cloud 111 to a neighbouring second local service cloud 112. The unique NAT:ed IP address is unique at least in all local service clouds neighbouring to the first local service cloud 111, including the second local service cloud 112. 2. The uniqueness of the unique NAT:ed IP address may be created by NAT:ing the UE IP address to a public IPv6 address or a public IPv4 address.

In some embodiments, the unique NAT:ed IP address mapping to the UE IP address of the UE 120, further is mapped to at least one port number of the UE 120

Action 203

The network node 110 then assigns the unique NAT:ed IP address to the UE 120 for local break out of the traffic flow of the application session to the first local service cloud 111. Please note that assign the unique NAT:ed IP address to the UE 120 here may also be referred to as allocate the unique NAT:ed IP address to the UE 120.

Action 204

The network node 110 may map to a radio bearer, a downlink for the traffic flow of the application session to the first local service cloud 112, by using the unique NAT:ed IP address as an identifier.

In some embodiments, the assigned unique NAT:ed IP address is any one out of:

Assigned a maximum time-to-live for and when the maximum time-to-live expires, the NAT:ed IP address is reused, and de-allocated when it has not been used for a certain time.

An advantage of the unique NAT:ed IP address is that it is enabled to be used for the traffic flow both before and after a handover of the UE 120 from the first local service cloud 111 to a neighbouring second local service cloud 112.

In the methods below, it is described how the cloud orchestration server 115 provides NAT:ed IP addresses by using default IP address prefix assignment. The IP address prefix and the local IP address prefixes described below may relate to any one out of IPv4 and IPv6. Embodiments of the method when implemented using IPv6 will be described in relation to FIG. 3. Embodiments of the method when implemented using IPv4 will be described in relation to FIG. 4.

Figure 3:
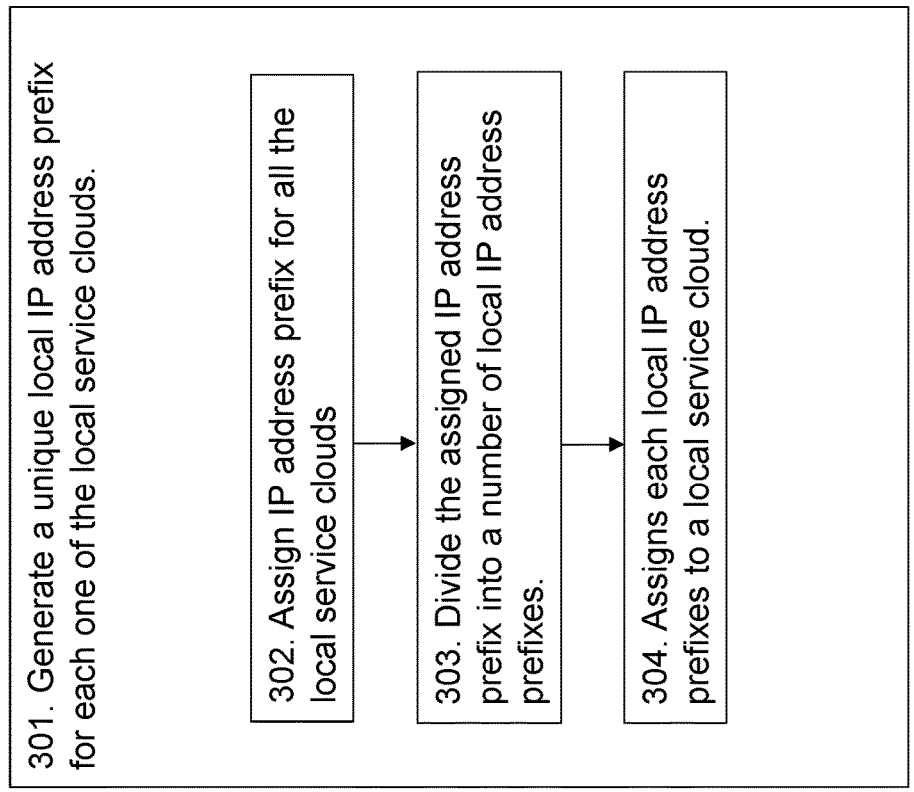
FIG. 3 a flowchart depicting embodiments of a method in a cloud orchestration server.

Example embodiments of a method in a cloud orchestration server 115 for handling Internet Protocol, IP, address prefixes for local service clouds in a set of local service clouds 111, 112 will now be described with reference to a flowchart depicted in FIG. 3. The set of local service clouds comprises the local service clouds in the wireless network 100 including the first local service cloud 111 and the second local service cloud 112. As mentioned above in the embodiments of FIG. 3, the IP address prefix and the local IP address prefixes relate to IPv6.

The method is described in a general way first. The method will then be described more in detail below. The method comprises the following actions, which actions may be taken in any suitable order. Dashed lines of some boxes in FIG. 4 indicate that this action is not mandatory.

Action 301

The cloud orchestration server 115 generates a unique local IP address prefix for each one of the respective local service clouds in the set of local service clouds 111, 112. The unique local IP address prefix is for creating unique NAT:ed IP address mapping to an UE IP address.

The action 301 of the generating the unique local IP address prefix to each of the respective local service cloud in the set of local service clouds 111, 112 further comprises the actions 302, 303, and 304 below, which are sub actions to action 301.

Action 302

The cloud orchestration server 115 assigns an IP address prefix for all the local service clouds in the set of local service clouds 111, 112.

Action 303

The cloud orchestration server 115 then divides the assigned IP address prefix into a number of local IP address prefixes, wherein the number of local IP address prefixes is equal to the number of local service clouds in the set of local service clouds 111, 112.

Action 304

The cloud orchestration server 115 assigns each one out of the number of local IP address prefixes to each respective local service cloud in the set of local service clouds 111, 112, such that each local IP address prefix is unique among the local IP address prefixes of the local service clouds in the set of local service clouds 111, 112. The local IP address prefixes are to be assigned to User Equipments, UEs, for local break out of traffic flows of application sessions to local service clouds in the set of local service clouds 111, 112. In some embodiments, the cloud orchestration server 115 rounds of the number of IP address prefix bits needed to divide the large IP address prefix between the local service clouds to a suitable bit aligned IP address prefix.

Figure 4:
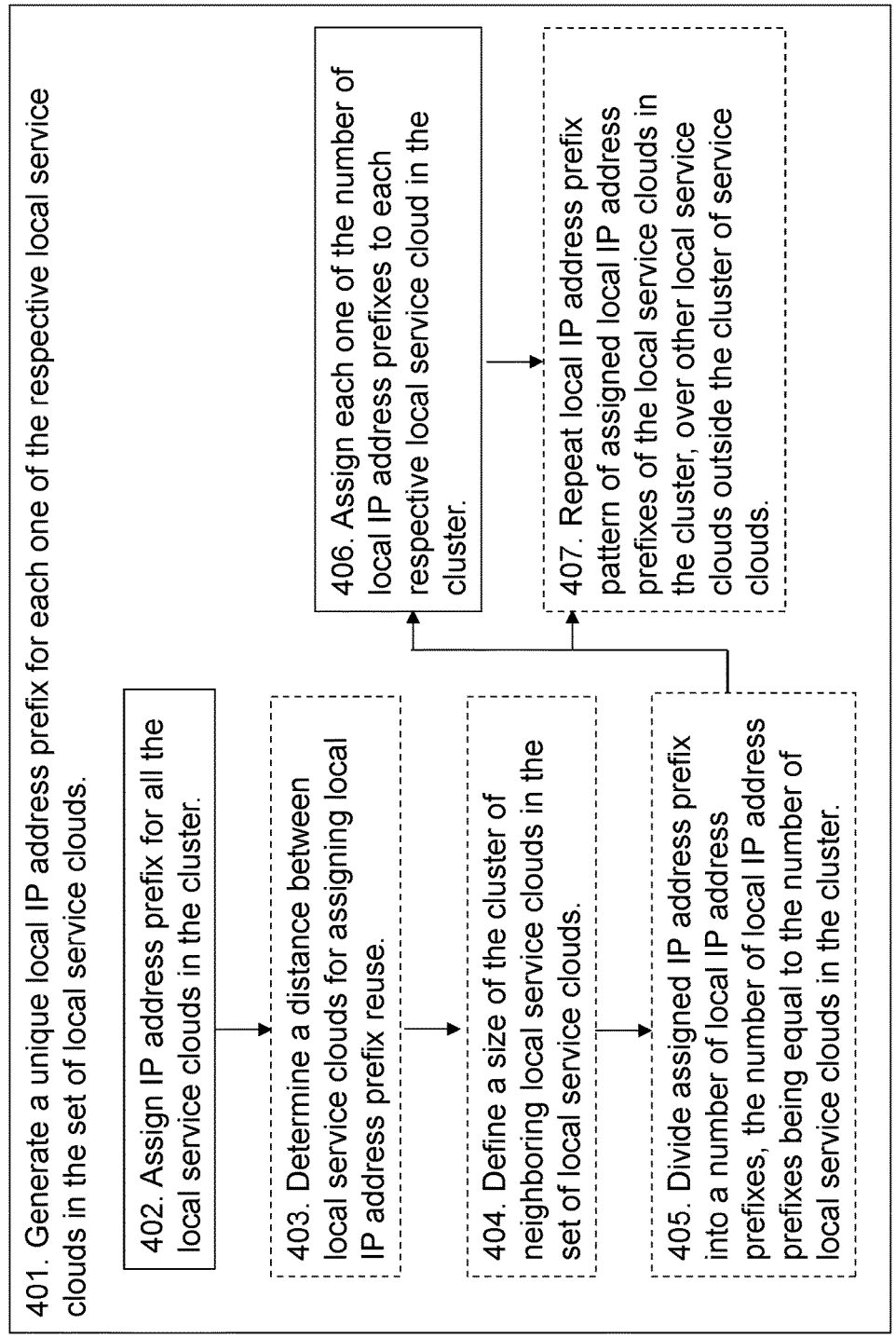
FIG. 4 a flowchart depicting embodiments of a method in a cloud orchestration server.

Example embodiments of a method in a cloud orchestration server 115 for handling IP address prefixes for local service clouds in a set of local service clouds 111, 112 will now be described with reference to a flowchart depicted in FIG. 4. In these embodiments the IP address prefix and the local IP address prefixes relate to IPv4. In these embodiments, the set of local service clouds comprises a cluster of neighboring local service clouds, including the first local service cloud 111 and the second local service cloud 112.

The method is described in a general way first. The method will then be described more in detail below. The method comprises the following actions, which actions may be taken in any suitable order. Dashed lines of some boxes in FIG. 4 indicate that this action is not mandatory.

Action 401

The cloud orchestration server 115 generates a unique local IP address prefix for each one of the respective local service clouds in the set of local service clouds 111, 112. The unique local IP address prefix is for creating unique NAT:ed IP address mapping to an UE IP address. This is similar to Action 301.

The action 401 of the generating the unique local IP address prefix to each of the respective local service cloud in the set of local service clouds 111, 112 further comprises the actions 402-407 below, which are sub actions to action 401.

Action 402

The cloud orchestration server 115 assigns an IP address prefix for all the local service clouds in the set of local service clouds 111, 112. This is similar to action 302. This means that the cloud orchestration server 115 assigns an IP address prefix for all the local service clouds in the cluster.

Action 403

The cloud orchestration server 115 determines a distance between local service clouds for assigning local IP address prefix reuse, which distance is in terms of number of local service clouds.

In some embodiments, the local service cloud distance for local IP address prefix reuse, comprises local IP address prefix reuse of any one out of: geographic distance, number of inter cell handover hops, number of inter local service clouds handover hops, and inter base station handover hops.

Action 404

The cloud orchestration server 115 defines a size of the cluster of neighboring local service clouds in the set of local service clouds 111, 112, based on the determined local service cloud distance for local IP address prefix reuse, Action 405

The cloud orchestration server 115 divides the assigned IP address prefix into a number of local IP address prefixes, wherein the number of local IP address prefixes is equal to the number of local service clouds in the set of local service clouds 111, 112. This is similar to action 303. However, in the IPv4 embodiments, the dividing of the assigned IP address prefix into a number of local IP address prefixes, is performed based on the size of the cluster. In some embodiments, the cloud orchestration server 115 rounds of the number of IP address prefix bits needed to divide the large IP address prefix between the local service clouds to a suitable bit aligned IP address prefix.

Action 406

The cloud orchestration server 115 assigns each one out of the number of local IP address prefixes to each respective local service cloud in the set of local service clouds 111, 112, such that each local IP address prefix is unique among the local IP address prefixes of the local service clouds in the set of local service clouds 111, 112, which local IP address prefixes are to be assigned to User Equipments, UEs, for local break out of traffic flows of application sessions to local service clouds in the set of local service clouds 111, 112. This is similar to action 304. However, in the IPv4 embodiments, the assigning of each one out of the number of local IP address prefixes to each respective local service cloud in the set of local service clouds 111, 112, is performed to each respective local service cloud in the cluster.

Action 407

According to some embodiments, the local IP address prefixes assigned to each respective local service cloud in the cluster, define a local IP address prefix pattern of assigned local IP address prefixes of the local service clouds in the cluster.

In these embodiments, the cloud orchestration server 115 repeat the local IP address prefix pattern of assigned local IP address prefixes of the local service clouds in the cluster, over other local service clouds outside the cluster of service clouds. This is performed such that local service clouds assigned with the same local IP address prefixes have the determined distance between each other.

The text below is applicable to any suitable embodiment described above.

Embodiments Relating to IPv6 within the Local Service Clouds

Below examples of Global UE-Addressing with NATs is described. A NAT:ed IPv6 address is globally unique over the local service clouds in the whole wireless network 100. There are no limitations of the address space and each local service cloud can have its own sub-address space assigned. The Cloud orchestration server 115 may provide automatic provisioning of NAT:ed IPv6 addresses by using default local IP address prefix assignment.

Below is an example of the above described flow diagram of FIG. 3.

Action 302. The cloud orchestration server 115 assigns one large IPv6 address prefix for all local service clouds in the set of service clouds such as e.g.

2014:ccdd:7007:acdb:0000:0000:0000:0000/64

Number of available prefix for use is 64-bits.

Action 303. The cloud orchestration server 115 divides the large local service cloud prefix among the number of local service clouds, one local IPv6 address prefix per local service cloud. In the example the number of local service clouds is 16000.

The number of IPv6 address prefix bits needed to divide the large prefix between the local service clouds is 14 bits in the example.

The number of IPv6 address prefix bits when aligned required is in the example 16 bits. This means that 14 bits are actually required, but after aligning it to a nearest power of 2, the result is 16 bits.

The final IPv6 address prefix for local service clouds is then 80 bits, i.e. 64-bits+16 bits.

Action 304. The cloud orchestration server 115 assigns IPv6 address prefix for local service clouds. This means that the cloud orchestration server 115 assigns each one out of the number of local IP address prefixes to each respective local service cloud in the set of local service clouds such that each local IP address prefix is unique among the local IP address prefixes of the local service clouds in the set of local service clouds.

For example:

```
Local Service cloud 1:
2014:ccdd:7007:acdb:0000:0000:0000:0000/80
Local Service cloud 2:
2014:ccdd:7007:acdb:0001:0000:0000:0000/80
Local Service cloud 3:
2014:ccdd:7007:acdb:0002:0000:0000:0000/80
...
...
Local Service cloud 1000:
2014:ccdd:7007:acdb:03e7:0000:0000:0000/80
...
...
Local Service cloud 8000:
2014:ccdd:7007:acdb:1f3f:0000:0000:0000/80
...
...
Local Service cloud 12000:
2014:ccdd:7007:acdb:2edf:0000:0000:0000/80
...
...
Local Service cloud 15999:
2014:ccdd:7007:acdb:3e7e:0000:0000:0000/80
Local Service cloud 16000:
2014:ccdd:7007:acdb:3e7f:0000:0000:0000/80
```

Embodiments Relating to IPv4 within the Local Service Clouds

IPv4 addresses are limited in number available addresses. According to embodiments herein, statistical reuse over a larger geographical area is a way to deal with this. The same address space can statistically be reused if the geographical distance is large due to that the session time is limited, i.e. a combination of mobility and session time. One example is to assign a maximum time-to-live for allocated IP-addresses. The allocation is made for a certain time and when the life-time expires, the address can be re-used. Such time based allocation may be made together with geographical re-use or as as only time based re-use without geographical considerations. Another example is to de-allocate the allocated IP address when it has not been used for a certain time. To this end the network node 110 performing the NAT or an entity related to the NAT would keep track of the usage of an allocated IP address and trigger de-allocation of the IP address when it has not been used for a certain period of time (provided that the UE still remains in the same cell). This explicit de-allocation scheme may be used on its own or in combination with geographical re-use, maximum time-to-live or both.

Figure 5A:
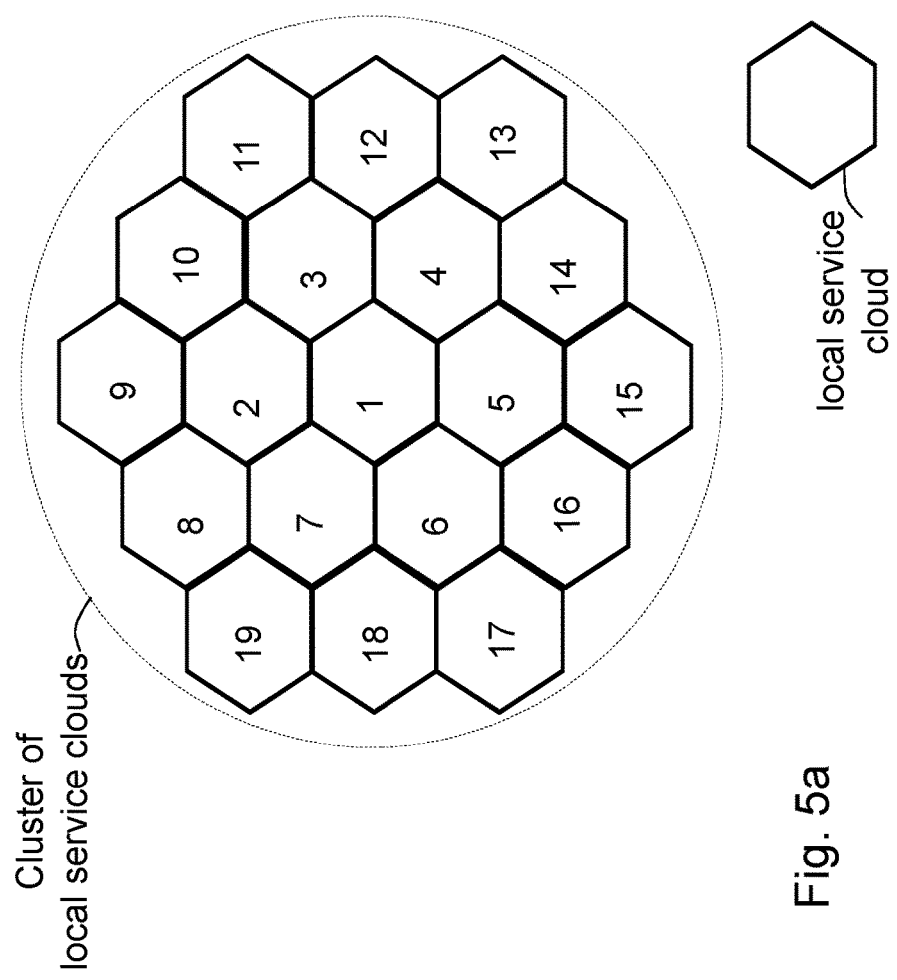
FIG. 5a is a schematic block diagram depicting embodiments of local service clouds.
Figure 5B:
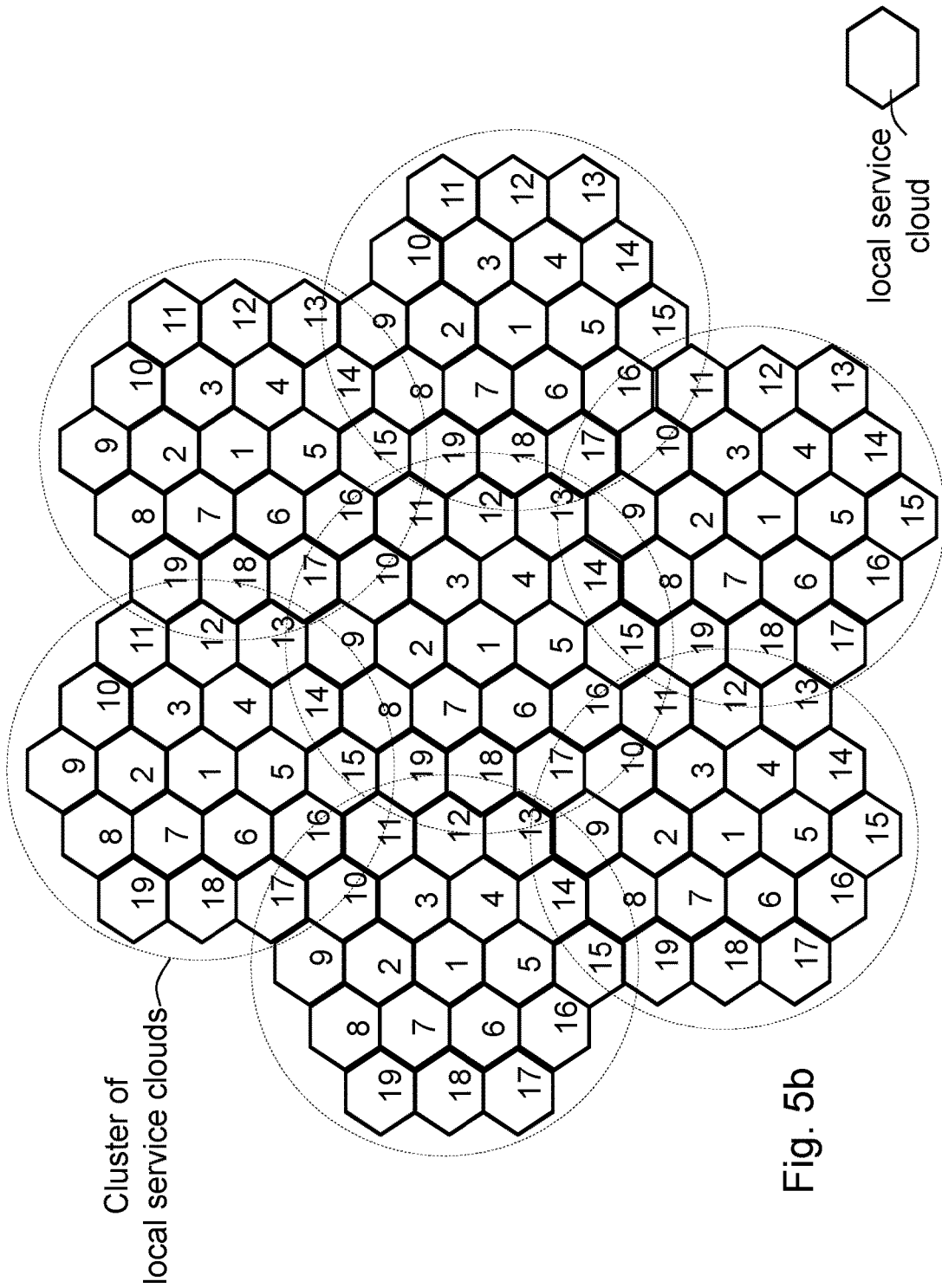
FIG. 5b is a schematic block diagram depicting embodiments of local service clouds.
Figure 6:
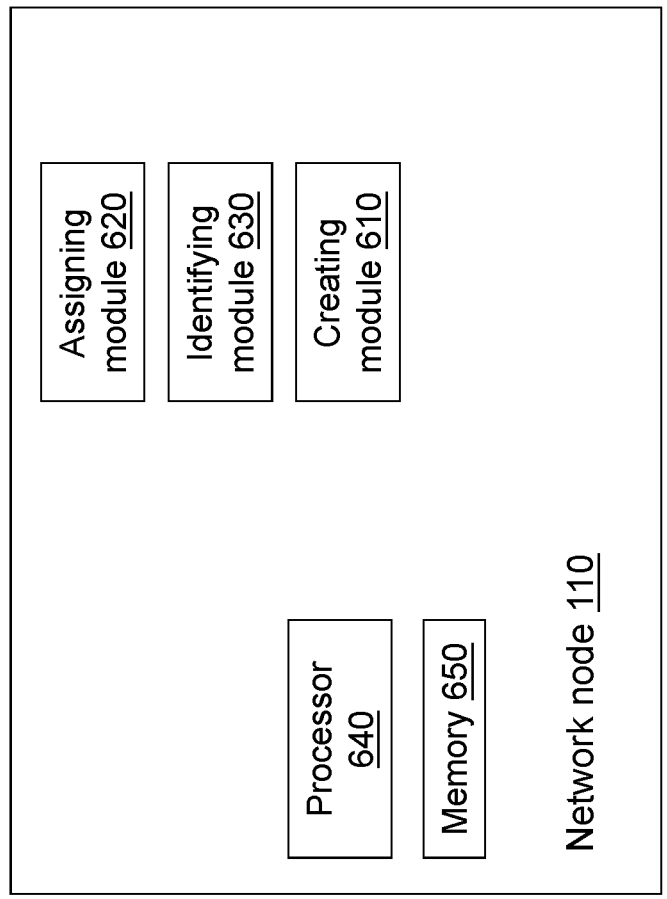
FIG. 6 a schematic block diagram illustrating embodiments of a network node.

A sequence for provisioning of local IPv4 address prefixes with geographical re-use may be performed as described below:

In FIGS. 5 and 6 below and in the example method below, a local service cloud is related to as a cell, since a local service cloud may be hosted at the base stations serving cells. the Local service cloud deployment can be model similar to base station deployment such as e.g. hexagonal cells, with 6 neighbours.

Below is an example of the above described flow diagram of FIG. 4 comprising geographical address reuse.

Action 402. The cloud orchestration server 115 assigns one large IPv4 network prefix for all local service clouds in the set of service clouds. An example of a Large IPv4 network prefix Is: 10.10.0.0/16

Action 403. The cloud orchestration server 115 determines a cell distance e.g. in terms of number of cells, for address reuse. The address reuse may be geographic.

The local service cloud distance after which an IPv4 address can be reused may be determined as a function of probability, 'A UE with an IPv4 address assigned to a local service cloud will move 'N' number of local service clouds which do not have the same address prefix as the local service cloud of a cell witch assigned the UE its IP.

The probability may be determined in many different known ways and is out of the scope of embodiments herein. For the example, assume that the local service cloud distance that a UE will move without colliding with the address prefix in another local service cloud is 4.

N=4

Action 404. The cloud orchestration server 115 determines the local service cloud cluster size based on the local service cloud distance.

A local service cloud cluster may be defined as a collection of hexagonal local service clouds without space between two local service clouds and the pattern of local service cloud cluster may be repeated by joining clusters together.

For example, a cluster radius 'R'=N/2

R=2

The number of local service clouds in the cluster may be determined by the formula:

$$[6(R)(R+1)/2]+1$$

The number of local service clouds in the cluster, M=[6(2)(2+1)/2]+1=19.

FIG. 5a illustrates a structure of the cell cluster with cluster size=19

Action 405. The cloud orchestration server 115 then divides the large IPv4 subnet into smaller subnet prefixes based on the cluster size.

In the example the large prefix 10.10.0.0/16 is divided into M smaller prefixes for each Local service cloud in each cell.

So M=19, and when aligning it to power of 2, the result is 32, i.e. 2 power of 5=32.

5 bits are needed to divide the large prefix into 32 smaller prefixes. So the smaller IPv4 address will have a 21-bit prefix (16+5).

Example of prefixes are as follows:

| | |
|---|---|
| 1. | 10.10.0.0/21 |
| 2. | 10.10.8.0/21 |
| 3. | 10.10.16.0/21 |
| 4. | 10.10.24.0/21 |
| ... | |
| ... | |
| 15. | 10.10.112.0/21 |
| 16. | 10.10.120.0/21 |
| 17. | 10.10.128.0/21 |
| 18. | 10.10.136.0/21 |
| 19. | 10.10.144.0/21 |
| ... | |
| ... | |

-continued

| 30. | 10.10.232.0/21 |
| 31. | 10.10.240.0/21 |
| 32. | 10.10.248.0/21 |

Action 406. The cloud orchestration server 115 assigns each of the local IP prefixes to different local service clouds in the cluster. In FIG. 5 each number in the hexagonal local service cloud represents a IPv4 address prefix represented by a digit between 1 and 19, that was determined in the last step.

Action 407. The cloud orchestration server 115 repeats the local service cloud cluster pattern with assigned IPv4 prefixes over other local service clouds. This is illustrated in FIG. 5*b*. It can be seen that no equal local IP prefixes, denoted by digits, are less than the local service cloud distance, N=4, in the example, away from each other.

To perform the method actions for handling a traffic flow of the UE 120, described above in relation to FIG. 2, the network node 110 may comprises the following arrangement depicted in FIG. 6. As mentioned above the network node 110 is arranged to be related to the first local service cloud 111, and the traffic flow is to be related to an application session served by the first local service cloud 111. The network node 110 may be arranged to be comprised in a base station 101.

The network node 110 is configured to, e.g. by means of a creating module 610 configured to, create a unique NAT:ed, IP address mapping to an UE IP address of the UE 120. The unique NAT:ed IP address comprises a local IP address prefix assigned to the first local service cloud 111. The unique NAT:ed IP address is enabled to be used for the traffic flow both before and after a handover of the UE 120 from the first local service cloud 111 to the neighbouring second local service cloud 112. The unique NAT:ed IP address is unique at least in all local service clouds neighbouring to the first local service cloud 111, including the second local service cloud 112.

In some embodiments, the unique NAT:ed IP address to be mapped to the UE IP address of the UE 120, further is to be mapped to at least one port number of the UE 120.

The network node 110 may further be configured to map to a radio bearer, a downlink for the traffic flow of the application session to the first local service cloud 112, by using the unique NAT:ed IP address as an identifier:

The network node 110 is further configured to, e.g. by means of an assigning module 620 configured to, assign the unique NAT:ed IP address to the UE 120 for local break out of the traffic flow of the application session to the first local service cloud 111.

The uniqueness of the unique NAT:ed IP address may be created by NAT:ing the UE IP address to a public IPv6 address or a public IPv4 address.

In some embodiments, the assigned unique NAT:ed IP address is any one out of:

An assigned a maximum time-to-live for and when the maximum time-to-live expires, the NAT:ed IP address is reused, and de-allocated when it has not been used for a certain time.

In some embodiments, the network node 110 further is configured to, e.g. by means of an identifying module 630 configured to, identify a UE IP address of the UE 120. The network node 110 may further is configured to, e.g. by means of the identifying module 630 configured to, identify a UE IP address and a port number OK? of the UE 120.

The embodiments herein relating to the process of handling a traffic flow of the UE 120, may be implemented through one or more processors, such as a processor 640 in the network node 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 650 comprising one or more memory units. The memory 650 comprises instructions executable by the processor 640. The memory 650 may be arranged to be used to store, data, traffic flows, IP addresses, NAT:ed IP addresses, configurations, and applications to perform the methods herein when being executed in the base station 110.

Those skilled in the art will also appreciate that the creating module 610, the assigning module 620, and the identifying module 630, described above may refer to a combination of analog and digital circuits, and/or one or more processors configured with software and/or firmware, e.g. stored in the memory 650, that when executed by the one or more processors such as the processor 640 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
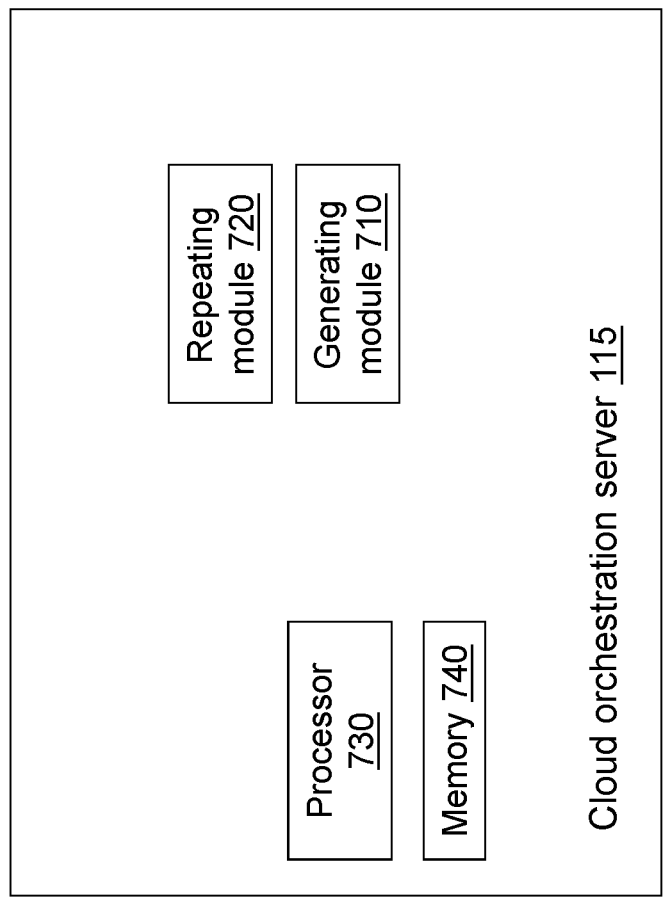
FIG. 7 a schematic block diagram illustrating embodiments of a cloud orchestration server.

To perform the method actions for handling IP address prefixes for local service clouds in a set of local service clouds 111, 112 described above in relation to FIGS. 3 and 4, the cloud orchestration server may comprise the following arrangement depicted in FIG. 7.

The cloud orchestration server 115 is configured, e.g. by means of a generating module 710 configured to, to generate a unique local IP address prefix for each one of the respective local service clouds in the set of local service clouds 111, 112. The unique local IP address prefix is for creating unique NAT:ed IP address mapping to the UE IP address. The IP address prefix and the local IP address prefixes may relate to any one out of IPv4 and IPv6.

The cloud orchestration server 115 is further configured to, e.g. by means of the generating module 710 configured to, generate the unique local IP address prefix to each of the respective local service cloud in the set of local service clouds 111, 112 by:

assigning an IP address prefix for all the local service clouds in the set of local service clouds 111, 112, dividing the assigned IP address prefix into a number of local IP address prefixes, wherein the number of local IP address prefixes is equal to the number of local service clouds in the set of local service clouds 111, 112, and assigning each one out of the number of local IP address prefixes to each respective local service cloud in the set of local service clouds 111, 112, such that each local IP address prefix is unique among the local IP address prefixes of the local service clouds in the set of local service clouds 111, 112, which local IP address prefixes are to be assigned to User Equipments, UEs, for local break out of traffic flows of application sessions to local service clouds in the set of local service clouds 111, 112.

In some embodiments, the IP address prefix and the local IP address prefixes relate to IPv4. In these embodiments the set of local service clouds 111, 112 is arranged to comprise a cluster of neighbouring local service clouds. The cloud orchestration server 115 may then be configured to e.g. by means of the generating module 710 configured to, generate the unique local IP address prefix to each of the respective local service clouds in the set of local service clouds 111, 112 by:

determining a distance between local service clouds for assigning local IP address prefix reuse, which distance is in terms of number of local service clouds, and defining a size of the cluster of neighbouring local service clouds in the set of local service clouds 111, 112, based on the determined local service cloud distance for local IP address prefix reuse, wherein the cloud orchestration server 115 further is configured to divide the assigned IP address prefix into a number of local IP address prefixes, based on the size of the cluster, and wherein the cloud orchestration server 115 further is configured to assign each one out of the number of local IP address prefixes to each respective local service cloud in the set of local service clouds 111, 112 to each respective local service cloud in the cluster.

The local service cloud distance for local IP address prefix reuse, may comprise local IP address prefix reuse of any one out of: geographic distance, number of inter cell handover hops, number of inter local service clouds handover hops, and inter base station handover hops.

In some embodiments the local IP address prefixes to be assigned to each respective local service cloud in the cluster, define a local IP address prefix pattern of assigned local IP address prefixes of the local service clouds in the cluster. In these embodiments, the cloud orchestration server 115 further is configured to e.g. by means of a repeating module 720 configured to, repeat the local IP address prefix pattern of assigned local IP address prefixes of the local service clouds in the cluster, over other local service clouds outside the cluster of service clouds, such that local service clouds assigned with the same local IP address prefixes have the determined distance between each other.

The embodiments herein relating to the process of handling IP address prefixes for local service clouds in the set of local service clouds 111, 112, may be implemented through one or more processors, such as a processor 730 in the cloud orchestration server 115 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the cloud orchestration server 115. One such carrier may be in the form of a CD ROM disc. It is however feasible with other data carriers such as a memory stick. The computer program code may furthermore be provided as pure program code on a server and downloaded to the cloud orchestration server 115.

The cloud orchestration server 115 may further comprise a memory 740 comprising one or more memory units. The memory 740 comprises instructions executable by the processor 730. The memory 740 may be arranged to be used to store, data, IP addresses, IP address prefixes, local IP address prefixes, directories, distances between local service clouds for assigning local IP address prefix reuse, sizes of the cluster of neighbouring local service clouds, configurations, applications etc. to perform the methods herein when being executed in the cloud orchestration server 115.

Those skilled in the art will also appreciate that the generating module 710, and repeating module 720 described above may refer to a combination of analog and digital circuits, and/or one or more processors configured with software and/or firmware, e.g. stored in the memory 740, that when executed by the one or more processors such as the processor 730 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method in a network node for handling a traffic flow of a User Equipment, UE, the network node being related to a first local service cloud, and the traffic flow is related to an application session served by the first local service cloud, the method comprising:

creating a unique Network Address Translated, NAT:ed, Internet Protocol, IP, address mapping to a UE IP address of the UE, the unique NAT:ed IP address having a local IP address prefix assigned to the first local service cloud, the unique NAT:ed IP address being usable for the traffic flow both before and after a handover of the UE from the first local service cloud to a neighbouring second local service cloud, the unique NAT:ed IP address is unique at least in all local service clouds neighboring to the first local service cloud, including the second local service cloud; and assigning the unique NAT:ed IP address to the UE for local break out of the traffic flow of the application session to the first local service cloud.

2. The method according to claim 1, wherein the uniqueness of the unique NAT:ed IP address is created by NAT:ing the UE IP address to one of a public IPv6 address and a public IPv4 address.

3. The method according to claim 1, further comprising: identifying a UE IP address of the UE.

4. The method according to claim 1, further comprising: identifying a UE IP address and a port number of the UE.

5. The method according to claim 1, wherein the unique NAT:ed IP address mapping to the UE IP address of the UE is further mapped to at least one port number of the UE.

6. The method according to claim 1, further comprising: mapping, to a radio bearer, a downlink for the traffic flow of the application session to the first local service cloud, by using the unique NAT:ed IP address as an identifier.

7. The method according to claim 1, wherein the assigned unique NAT:ed IP address is any one of:

assigned a maximum time-to-live and, when the maximum time-to-live expires, the NAT:ed IP address is reused; and de-allocated when it has not been used for a certain time.

8. The method according to claim 1, wherein the network node is arranged to be included in a base station.

9. A network node for handling a traffic flow of a User Equipment, UE, the network node configured to be related to a first local service cloud, and the traffic flow is to be related to an application session served by the first local service cloud, the network node being configured to:

create a unique Network Address Translated, NAT:ed, Internet Protocol, IP, address mapping to an UE IP address of the UE, the unique NAT:ed IP address having a local IP address prefix assigned to the first local service cloud, the unique NAT:ed IP address being usable for the traffic flow both before and after a handover of the UE from the first local service cloud to a neighbouring second local service cloud, and the unique NAT:ed IP address is unique at least in all local service clouds neighboring to the first local service cloud, including the second local service cloud; and assign the unique NAT:ed IP address to the UE for local break out of the traffic flow of the application session to the first local service cloud.

10. The network node according to claim 9, wherein the uniqueness of the unique NAT:ed IP address is to be created by NAT:ing the UE IP address one of a public IPv6 address and a public IPv4 address.

11. The network node according to claim 9, wherein the network node is further configured to identify a UE IP address of the UE.

12. The network node according to claim 9, wherein the network node is further configured to identify a UE IP address and a port number of the UE.

13. The network node according to claim 9, wherein the unique NAT:ed IP address to be mapped to the UE IP address of the UE, is further to be mapped to at least one port number of the UE.

14. The network node according to claim 9, wherein the network node is further configured to map to a radio bearer, a downlink for the traffic flow of the application session to the first local service cloud by using the unique NAT:ed IP address as an identifier.

15. The network node according to claim 9, wherein the assigned unique NAT:ed IP address is one of:

assigned a maximum time-to-live and, when the maximum time-to-live expires, the NAT:ed IP address is reused; and de-allocated when it has not been used for a certain time.

16. The network node according to claim 10, wherein the network node is configured to be comprised in a base station.

* * * * *